(12) United States Patent
Alakarhu et al.

(10) Patent No.: US 12,200,325 B2
(45) Date of Patent: Jan. 14, 2025

(54) DUAL MODE CAMERA AND QUASI-BANDPASS FILTER

(71) Applicant: Axon Enterprise, Inc., Scottsdale, AZ (US)

(72) Inventors: Juha Alakarhu, Tampere (FI); Mikko Vaahteranoksa, Tampere (FI)

(73) Assignee: Axon Enterprise, Inc., Scottsdale, AZ (US)

( * ) Notice: Subject to any disclaimer, the term of this patent is extended or adjusted under 35 U.S.C. 154(b) by 21 days.

(21) Appl. No.: 17/886,952

(22) PCT Filed: Feb. 12, 2021

(86) PCT No.: PCT/US2021/018045
§ 371 (c)(1),
(2) Date: Aug. 12, 2022

(87) PCT Pub. No.: WO2021/230933
PCT Pub. Date: Nov. 18, 2021

(65) Prior Publication Data
US 2023/0336847 A1   Oct. 19, 2023

Related U.S. Application Data

(60) Provisional application No. 62/975,607, filed on Feb. 12, 2020.

(51) Int. Cl.
*H04N 23/11* (2023.01)
*H04N 7/18* (2006.01)
(Continued)

(52) U.S. Cl.
CPC ............ *H04N 23/11* (2023.01); *H04N 7/183* (2013.01); *H04N 23/667* (2023.01);
(Continued)

(58) Field of Classification Search
CPC .... H04N 23/11; H04N 23/667; H04N 25/131; H04N 23/86; H04N 23/74; H04N 23/88; H04N 23/71; H04N 7/183; G02B 5/208
See application file for complete search history.

(56) References Cited

U.S. PATENT DOCUMENTS 6,642,955 B1    11/2003  Midgley et al.
6,759,646 B1 *   7/2004  Acharya ................ G02B 5/201
                                                    250/226
(Continued)

FOREIGN PATENT DOCUMENTS

CA    3093545    * 10/2019
EP    3109822    * 10/2009
(Continued)

OTHER PUBLICATIONS

SATO translation of JP 2019012897 Jun. 29, 2017 (Year: 2017).*
(Continued)

*Primary Examiner* — Zaihan Jiang
(74) *Attorney, Agent, or Firm* — Andrew Terajewicz; Andrew Graham

(57) ABSTRACT

A dual mode camera may have a camera module and a light source. The camera module may include a quasi-bandpass filter for passing visible light and passing an attenuated portion of near-infrared light to an image sensor for detection. A processor may determine an ambient lighting condition corresponding with an amount of ambient visible light detected by a photodetector. In response to a first ambient lighting condition, the processor may send a first control signal to an encoder to encode image data in monochrome, and another signal to activate a light source. In response to a second ambient lighting condition, the processor may send a second control signal to the encoder to encode image data in color. The light source may emit a band of near-infrared light corresponding with an atmospheric absorption band.

(Continued)

The quasi-bandpass filter may attenuate a portion of near-infrared light corresponding with the same atmospheric absorption band.

20 Claims, 2 Drawing Sheets

(51) Int. Cl.
    *H04N 23/667*      (2023.01)
    *H04N 23/71*      (2023.01)
    *H04N 23/74*      (2023.01)
    *H04N 23/86*      (2023.01)
    *H04N 23/88*      (2023.01)
    *H04N 25/131*      (2023.01)
    *G02B 5/20*      (2006.01)

(52) U.S. Cl.
    CPC ............. *H04N 23/71* (2023.01); *H04N 23/74* (2023.01); *H04N 23/86* (2023.01); *H04N 23/88* (2023.01); *H04N 25/131* (2023.01); *G02B 5/208* (2013.01)

(56) References Cited

U.S. PATENT DOCUMENTS

| | | |
|---|---|---|
| 7,768,566 B2 | 8/2010 | Monroe |
| 8,693,089 B2 | 4/2014 | Saitoh et al. |
| 9,091,903 B2 | 7/2015 | Bunker et al. |
| 2003/0093805 A1 | 5/2003 | Gin |
| 2003/0112353 A1* | 6/2003 | Morris ................. H04N 25/134 |
| | | 348/222.1 |
| 2009/0159799 A1 | 6/2009 | Copeland et al. |
| 2012/0025080 A1 | 2/2012 | Liu et al. |
| 2012/0087645 A1* | 4/2012 | Wu ..................... H04N 25/131 |
| | | 348/342 |
| 2014/0347493 A1 | 11/2014 | Higashitsutsumi et al. |
| 2017/0094141 A1 | 3/2017 | Hicks |
| 2018/0031745 A1 | 2/2018 | Kim et al. |
| 2019/0110037 A1* | 4/2019 | Lukac ..................... H04N 5/33 |

FOREIGN PATENT DOCUMENTS

| | | | |
|---|---|---|---|
| JP | 2019012897 | * | 6/2017 |
| JP | 7137607 | * | 11/2020 |
| WO | WO-2014084199 | * | 11/2013 |

OTHER PUBLICATIONS

Butte translation of JP 7137607 Nov. 18, 2020 (Year: 2020).*
USUI translation of WO 2014084199 Jun. 5, 2014 (Year: 2014).*
Korean Intellectual Property Office, International Search Report for International Application No. PCT/US2021/018045 mailed Dec. 6, 2021.

* cited by examiner

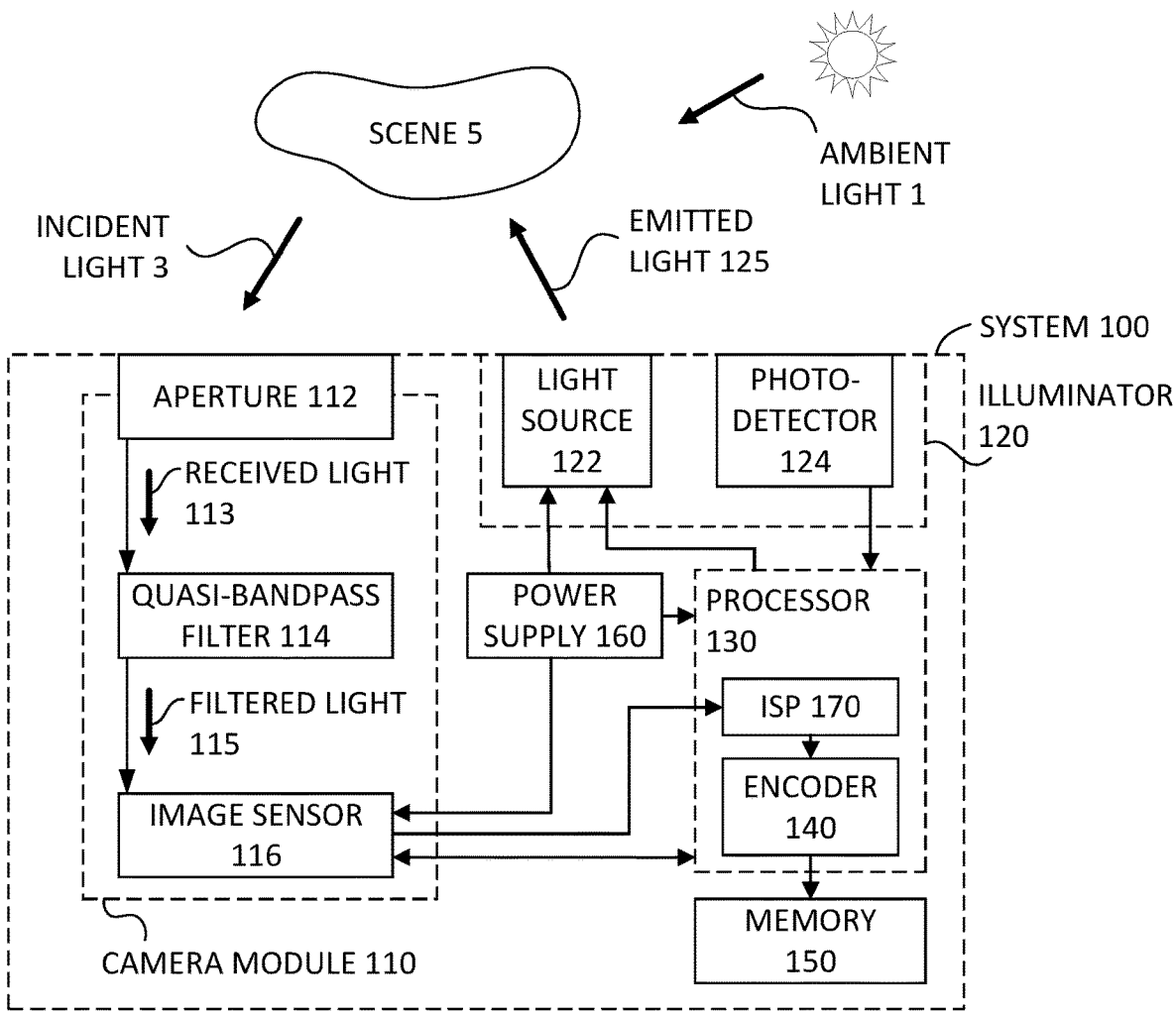
FIG. 1
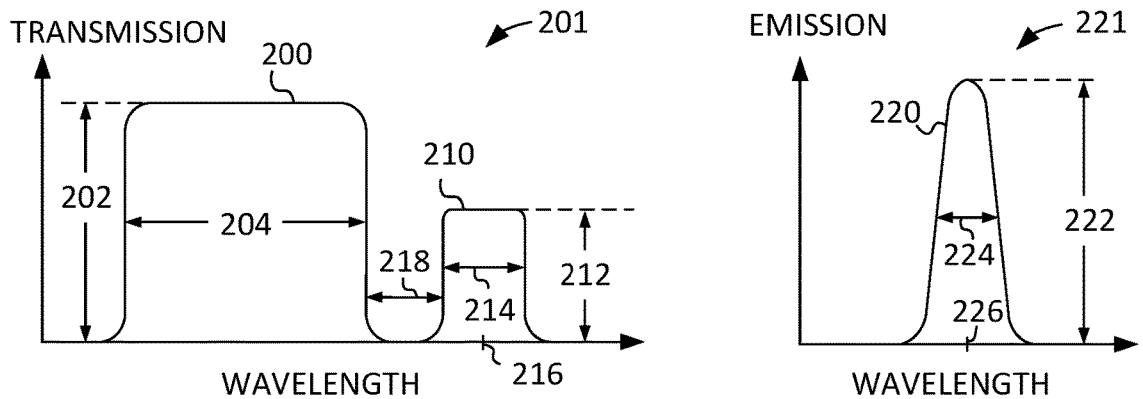
FIG. 2A
FIG. 2B

DUAL MODE CAMERA AND QUASI-BANDPASS FILTER

CROSS-REFERENCE TO RELATED APPLICATIONS

This application is a national stage application of International Application No. PCT/US2021/18045, filed Feb. 12, 2021, which claims the benefit of U.S. Provisional Application No. 62/975,607, filed Feb. 12, 2020, both of which is hereby incorporated by reference in their entirety.

BACKGROUND

Monitoring cameras such as security cameras, surveillance cameras, and the like, may be employed in different lighting conditions. However, one or more components of a monitoring camera may not be optimized to capture images under different lighting conditions. Embodiments according to various aspects of the present disclosure enable image data to be reliably captured under different lighting conditions via one or more common components of a monitoring camera.

BRIEF SUMMARY

In light of the foregoing background, the following presents a simplified summary of the present disclosure in order to provide a basic understanding of some aspects of the embodiments disclosed herein. This summary is not an extensive overview of the invention. It is not intended to identify key or critical elements of the invention or to delineate the scope of the invention. The following summary merely presents some concepts of the invention in a simplified form as a prelude to the more detailed description provided below.

Aspects of this disclosure may relate to a camera, comprising an aperture for receiving light and a quasi-bandpass filter for filtering the light received by the aperture to provide filtered light, the filtered light including visible light and attenuated near-infrared light. The camera may also include an image sensor for detecting image data in response to the filtered light. A transmission spectrum of the quasi-bandpass filter may include a visible band comprising wavelengths of the visible light. The visible band may also include a peak visible transmittance. The transmission spectrum may also include a near-infrared band comprising wavelengths of the attenuated near-infrared light. The near-infrared band may also include a peak near-infrared transmittance. The peak near-infrared transmittance may be greater than 1% and less than 50%.

Implementations of the camera may include where the peak visible transmittance of the visible band of the quasi-bandpass filter may be greater than 80%. The near-infrared band may include a near-infrared atmospheric absorption band. In some embodiments, the wavelengths of near-infrared band may include a rho sigma tau (ρστ) atmospheric absorption band. The camera may further comprise a light source having an emission band overlapping at least a portion of the near-infrared band of the quasi-bandpass filter. In some embodiments, a center wavelength of the light source may be about 950 nanometers, wherein about refers to plus or minus five nanometers. In addition, the image sensor may comprise a color filter array consisting of visible color pixels. In some embodiments, the quasi-bandpass filter is a static, fixed filter. Additionally, the quasi-bandpass filter may be a single thin film interference filter.

Another aspect of this disclosure may relate to a surveillance system comprising a quasi-bandpass filter for passing wavelengths of visible light and attenuating a band of wavelengths of near-infrared light. The peak non-infrared transmittance of the quasi-bandpass filter may be greater than zero for the band attenuated by the quasi-bandpass filter and less than a peak visible transmittance of the quasi-bandpass filter for the wavelengths of visible light. The surveillance system may also comprise an image sensor for receiving the wavelengths of visible light and the band of wavelengths attenuated by the quasi-bandpass filter. Additionally, the surveillance system may include a light source having an emission band overlapping at least a portion of the band attenuated by the quasi-bandpass filter. Furthermore, the surveillance system may include a photodetector configured to detect a signal corresponding with an amount of ambient visible light and control the light source in accordance with the detected signal, where, in response to the photodetector detecting a first signal corresponding with a first amount of ambient light, a processor activates the light source, and where, in response to the photosensor detecting a second signal corresponding with a second ambient lighting condition of the ambient light, the processor deactivates the light source.

Implementations of the surveillance system may include where the image sensor comprises the photodetector. Other implementations include where the peak near-infrared transmittance may be greater than 1% of the peak visible transmittance and may not exceed 50% of the peak visible transmittance. The surveillance system may include an encoder where the encoder may be configured to encode image data received by the image sensor in accordance with the amount of ambient visible light detected by the photodetector. For example, in response to detecting the first amount of ambient visible light, image data generated by the image sensor may be encoded in monochrome by the encoder, and in response to detecting the second amount of ambient visible light, image data generated by the image sensor may be encoded in color by the encoder. The band attenuated by the quasi-bandpass filter may overlap with a near-infrared atmospheric absorption band. Additionally, the system may comprise an image signal processor configured to apply partial white balance processing under halogen lighting conditions to achieve non-neutral white balance. Lastly, the system may include an in-vehicle surveillance system.

Still other aspects of this disclosure may relate to a method for operating a dual mode camera. The method may comprise the steps of: providing a quasi-bandpass filter, an image sensor, and an encoder, where the image sensor may generate image data from ambient light, and the encoder may encode the image data; and passing the ambient light to the image sensor through the quasi-bandpass filter where the quasi-bandpass filter may pass visible light of the ambient light and attenuate a portion of near-infrared light of the ambient light. The quasi-bandpass filter may have a peak near-infrared transmittance greater than zero for the portion of near-infrared light of the ambient light and a peak near-infrared transmittance less than a peak visible transmittance of the visible light of the ambient light. Additionally, the method may include: determining a first ambient lighting condition of the ambient light; encoding the image data detected by the image sensor in a first mode, where the first mode may include encoding the image data in monochrome and activating a light source having an emission band overlapping at least a portion of the near-infrared light attenuated by the quasi-bandpass filter; determining a second ambient lighting condition of the ambient light; and encoding the image data detected by the image sensor in a second mode. The second mode may include encoding the image data in color. The first ambient lighting condition may be associated with a first detected signal corresponding with a first amount of the ambient visible light, and the second ambient lighting condition may be associated with a second detected signal corresponding with a second amount of ambient visible light. The first amount of ambient visible light may be less than the second amount of ambient visible light.

Implementations of the method may include where the portion of near-infrared light attenuated by the quasi-bandpass filter may overlap with a near-infrared atmospheric absorption band. In some embodiments, the peak near-infrared transmittance may be greater than 1% and may not exceed 50%. Determining the first ambient lighting condition of the ambient light may include determining that the first detected amount of the ambient visible light is greater than a reference value and determining the second ambient lighting condition of the ambient light may include determining that the second detected amount of the ambient visible light is less than the reference value.

BRIEF DESCRIPTION OF THE DRAWINGS

The present invention is illustrated by way of example, and is not limited by, the accompanying figures in which like reference numerals indicate similar elements and in which:

FIG. 1 shows a functional block diagram of a dual mode camera having a quasi-bandpass filter, according to one or more aspects described herein;

FIG. 2A shows a graph of a transmission spectrum of a quasi-bandpass filter, according to one or more aspects described herein;

FIG. 2B shows a graph of an emission spectrum of a light source, according to one or more aspects described herein.

DETAILED DESCRIPTION

Figure 3:
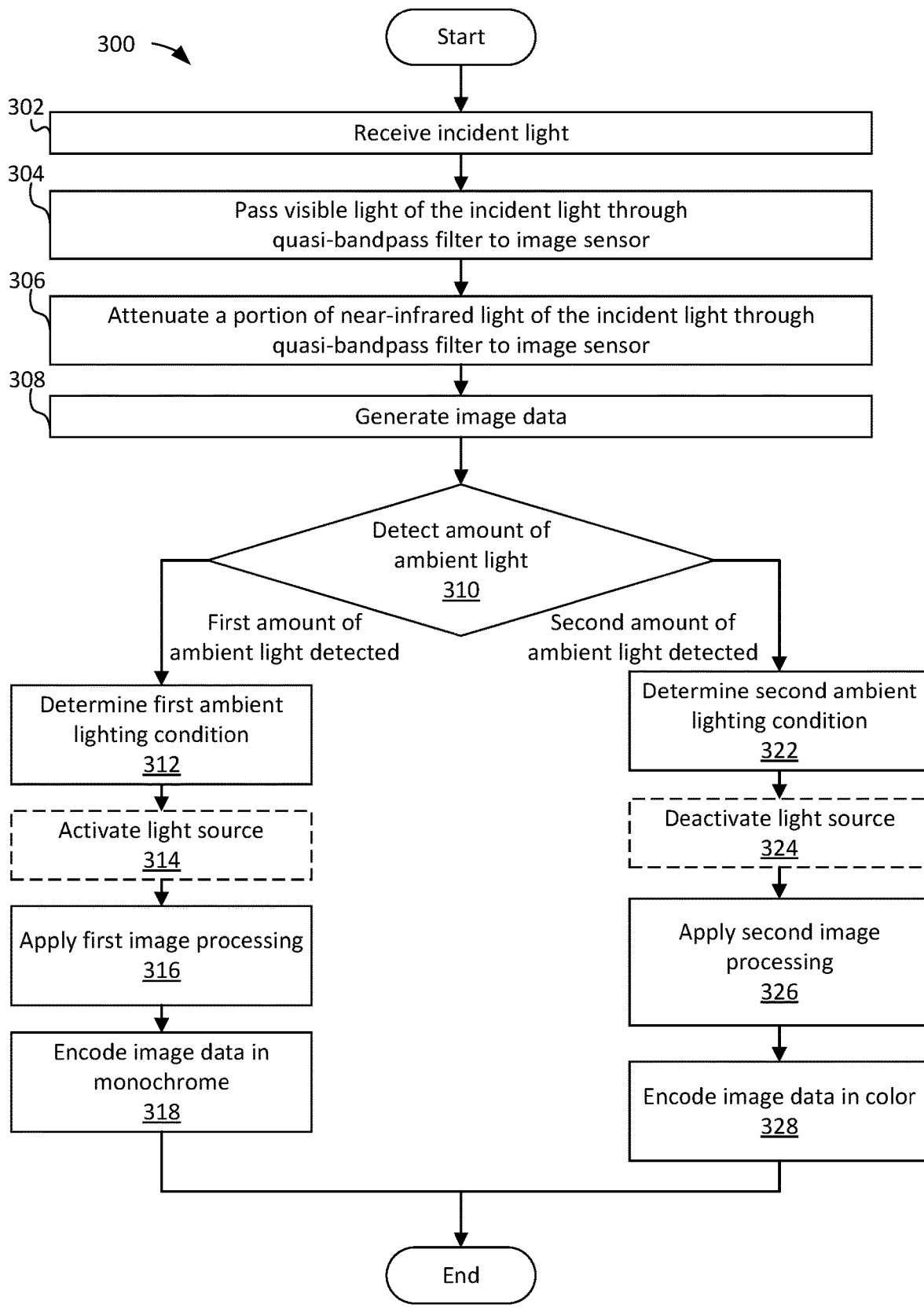
FIG. 3 shows an exemplary method of generating image data performed by a dual mode camera, according to one or more aspects described herein.

The detailed description of exemplary embodiments herein makes reference to the accompanying drawings, which show exemplary embodiments by way of illustration. While these embodiments are described in sufficient detail to enable those skilled in the art to practice the disclosures, it should be understood that other embodiments may be realized and that logical changes and adaptations in design and construction may be made in accordance with this disclosure and the teachings herein. Thus, the detailed description herein is presented for purposes of illustration only and not of limitation.

The scope of the disclosure is defined by the appended claims and their legal equivalents rather than by merely the examples described. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, coupled, connected, or the like may include permanent, removable, temporary, partial, full, and/or any other possible attachment option. Additionally, any reference to without contact (or similar phrases) may also include reduced contact or minimal contact. Surface shading lines may be used throughout the figures to denote different parts but not necessarily to denote the same or different materials.

A monitoring camera such as a security camera, a surveillance camera, and the like, may operate in one of two modes depending on lighting conditions. When ambient light is readily available, a monitoring camera may operate in a color mode (e.g., a day mode), in which image data is recorded in color. In low-light to no-light conditions, when ambient light is limited, a monitoring camera may operate in an infrared (IR) mode (e.g., night mode), in which image data is recorded monochrome (e.g., black and white). In IR mode, a monitoring camera may use an IR light source to illuminate a scene. Because certain wavelengths of IR light are imperceptible by the human eye, an IR light source provides covertness and minimizes disruption to individuals in the vicinity of the camera.

A monitoring camera may use an image sensor to capture image data. An image sensor, such as complementary metal-oxide semiconductor ("CMOS") image sensor or charged-coupled device ("CCD") image sensors, may be sensitive to wavelengths of light starting from about 380 nanometers up to about 1100 nanometers. However, the human eye is sensitive only to the visible spectrum, which is about 380 nanometers to about 650 nanometers. Light beyond the visible spectrum, such as infrared light, poses challenges to an image sensor. IR light may negatively impact color fidelity and sharpness of the image detected by the image sensor. This is particularly problematic for monitoring cameras, which are sensitive to both visible light and IR light. A monitoring camera employing color and IR modes may be challenged with optimizing image quality across both operating modes. Images captured when visible light is readily available (e.g., during the day) should have high color fidelity and sharpness, while images captured in low or no visible light conditions (e.g., during the evening, in enclosed spaces, etc.) should also have acceptable image quality (e.g., high sharpness, etc.).

Technology for optimizing image quality in monitoring cameras between day and night modes exists. For example, US Patent Application 2003/0093805, which is herein incorporated by reference in its entirety, is entitled, "Dual Camera Surveillance and Control System" and describes a "dual camera surveillance and control system. The system comprises a high sensitivity mono camera with enhanced infrared response, an infrared illuminator array for zero ambient light surveillance, and a color camera that does not need to be enhanced in the infra red spectrum. The system also comprises ambient light level sensing, video signal switching technology and power conversion circuitry. The system combines optimized mono imaging under low or no light conditions with optimized color rendered imaging during high ambient light conditions, with both achieving high quality focus. The dual camera nature of the system is transparent to the user due to the integrated automated control of the system, and allows reduced power consumption, making the system suitable for a wireless, remote, self-contained system that draws power from the ambient environment." However, the complexity and cost associated with employing a high sensitivity mono camera and a color camera poses a significant disadvantage.

Similarly, U.S. Pat. No. 7,768,566, which is herein incorporated by reference in its entirety, is entitled, "Dual-mode camera" and describes a "dual camera system uses a single lens and no moving parts in the optical path. A single lens directs a desired scene to a partially reflective beamsplitting mirror, thence to a pair of image sensors. For day/night operation, one sensor may be optimized for nighttime sensitivity, while the other is optimized for daytime operation. Alternatively, one optical path may have greater magnification, thus allowing electronic zooming with no resolution loss. The system may be enhanced with an image intensifier for nighttime operation; digital sensors for improved resolution, or orthogonal gyroscopic accelerometers for image stabilization. Additionally, the monochrome and color images may be produced simultaneously and 'fused' algorithmically, yielding an improvement in sensitivity and color resolution compared with a conventional color camera." Still, the complexity and cost associated with employing a pair of image sensors poses a significant disadvantage.

In addition, U.S. Pat. No. 9,091,903, which is herein incorporated by reference in its entirety, is entitled, "Optimized Movable Filter in Cameras" and describes "a camera having two modes: a visible light imaging mode (day-mode) and an IR imaging mode (night-mode). In the visible light imaging mode, an IR filter is in line with the lens assembly. In the IR imaging mode, the IR filter is mechanically removed, and IR light is allowed to pass to the sensor. In one embodiment, in the IR imaging mode, IR lighting is provided by an IR LEDs on the camera to illuminate the scene. In one embodiment, the various components are chosen, balanced and optimized so that images captured using visible light and images captured using non-visible light are both in focus. In one embodiment, an algorithm determines when sufficient visible light is present and when it is not, and thus determines when to switch the camera from one mode to another." In addition to the associated complexity and cost of a moveable IR filter, a moveable IR filter may suffer mechanical failure, posing yet another significant shortcoming.

Numerous novel and nonobvious features are disclosed herein for addressing one or more of the aforementioned shortcomings in the art.

Systems, methods, and apparatuses may be used to monitor scenes across a range of lighting conditions. For example, a dual mode camera (e.g., monitoring camera, surveillance camera, camera, etc.) may be used to monitor scenes in which visible light is readily available, as well as scenes in which visible light is limited and/or unavailable. Scenes may include areas under surveillance, such as traffic intersections, walkways, roads, vehicle cabins, jail cells, vaults, etc. Dual mode cameras may be of particular concern to those in law enforcement, emergency services, security, and the military. For example, a vehicle cabin of a police vehicle may be equipped with a dual mode camera for monitoring activity of an individual detained in the vehicle cabin. During the day, or when visible light is otherwise readily available, the dual mode camera may operate in a color (e.g., visible) mode and record images and/or video in color. During the evening, or when visible light is otherwise limited, the dual mode camera may operate in an infrared (IR) mode (e.g., monochrome mode) and record images and/or video in monochrome (e.g., grayscale). In the IR mode, a light source may provide near-infrared illumination to aid in illuminating the scene.

A dual mode camera may include a housing. The housing may include an aperture to receive light (e.g., incident light) from an environment external to the housing. The aperture may be an opening in the housing configured to allow light into the housing. The aperture may be fixed or variable.

A dual mode camera may include a quasi-bandpass filter configured to pass visible light to the image sensor. Because near-infrared light may negatively impact image quality (e.g., color fidelity, sharpness, etc.), the quasi-bandpass filter may also be configured to attenuate a band of near-infrared light and pass the attenuated band of near-infrared light to the image sensor. A peak transmittance of the attenuated band of near-infrared light may be less than 50% to minimize negative impacts on image quality. Additionally, the attenuated band of near-infrared light may correspond with an atmospheric absorption band to further minimize negative impacts on image quality. Attenuation of the band of near-infrared light may reduce the likelihood that wavelengths of the band of near-infrared light negatively impact image quality, especially when the dual mode camera is operating in color mode. However, a peak transmittance of the attenuated band of near-infrared light may be greater than 5% to enable sufficient light emitted by a light source in IR mode to still be detected by the image sensor, especially when the dual mode camera is operating in IR mode.

A dual mode camera may include an image sensor that is sensitive to both visible light and near-infrared light. Accordingly, in the color mode, sufficient visible light may be available for the dual mode camera to encode image data in color to produce images of acceptable image quality. In the IR mode, an illuminator may artificially illuminate the scene with near-infrared light. Accordingly, in the IR mode, the dual mode camera may encode image data in monochrome (e.g., grayscale), as there may be sufficient near-infrared light available but insufficient visible light available, for the dual mode camera to encode image data in color, while having acceptable image quality. Because a dual mode camera may be sensitive to both visible light and near-infrared light, a dual mode camera may be desirable in systems that do not require ultimate color fidelity. Therefore, surveillance systems may be ideal applications for such a camera.

A dual mode camera may include an illuminator configured to emit a band of light corresponding with the band of near-infrared light attenuated by the quasi-bandpass filter. Although the band of light emitted by the illuminator may be attenuated by the quasi-bandpass filter, the dual mode camera may be configured to still detect image data of an object illuminated solely, or in part by the illuminator. In other words, in IR mode, the illuminator may provide sufficient illumination to illuminate an object, such that incident light reflected off the object, although attenuated by the quasi-bandpass filter, may still be detected by the image sensor.

In use (e.g., during operation), incident light reflected off an object (e.g., scene) may be received by a dual mode camera through an aperture (e.g., opening). The received light may be filtered by a quasi-bandpass filter. The filtered light may be detected by an image sensor. The image sensor may detect raw (e.g., sensor) image data from the filtered light and transmit the raw image data to an image signal processor (ISP). The ISP may process the raw image data by, for example, applying Bayer transformations, white balance corrections, color corrections, and image dewarping. The processed image data may then be encoded in a mode corresponding with an operating mode of the dual mode camera. A processor may determine the operating mode of the camera. The processor may determine the operating mode of the camera from an amount of ambient light available. A sensor, such as a photodetector (and in some cases the image sensor) may detect a signal corresponding with the amount of ambient light available and report the detected signal to the processor, such that the processor may determine an ambient lighting condition and thereby determine the operating mode of the camera.

In color mode, a dual mode camera may be configured to generate image data in color. That is, in color mode the processor may provide instructions to the ISP to process the image data in color. The processor may further provide instructions to an encoder to encode processed image data in color. A data format applied to image data by the encoder may retain color information in the image data. Generating the image data may further comprise one or more of recording the image data encoded in color in non-transitory computer-readable media and/or transmitting the image data encoded in color from the dual mode camera. In IR mode (e.g., monochrome mode), the dual mode camera may be configured to generate image data in monochrome. That is, in IR mode the processor may provide instructions to the image signal processor to process the image data in monochrome. The processor may further provide instructions to an encoder to encode processed image data in monochrome. A data format (e.g., grayscale, etc.) applied to image data by the encoder may exclude color information from the image data but retain luminance information in the image data. Generating the image data may further comprise one or more of recording the image data encoded in monochrome in non-transitory, computer-readable media and/or transmitting the image data encoded in monochrome from the dual mode camera. In IR mode, the processor may provide instructions to activate (e.g., trigger) the light source.

In various embodiments and with reference to FIG. 1, a dual mode camera system (e.g., monitoring system, surveillance system, etc.) may be provided. System 100 may comprise a dual mode camera system, is disclosed. System 100 may be similar to, or have similar aspects and/or components with, the dual mode cameras previously discussed herein. It should be understood by one skilled in the art that FIG. 1 is an example illustration of system 100, and one or more of the components of system 100 may be located in any suitable position within, or external to, system 100. Components of system 100 may be configured to be housed in a single enclosure, or multiple enclosures. System 100 may be configured to be disposed in a location for monitoring a scene, such as mounted to a vehicle (e.g., inside a vehicle cabin, on the exterior of a vehicle, etc.) or mounted to a stationary structure (e.g., building, wall, post, etc.). In various embodiments, system 100 may be an in-vehicle surveillance system. In the example of FIG. 1, system 100 may comprise a camera module 110, an illuminator 120, a processor 130, a memory 150, and a power supply 160.

In various embodiments, camera module 110 may be configured to detect (e.g., generate) image data from incident light, such as incident light 3. Incident light 3 may comprise light reflected by a scene (e.g., object), such as scene 5. Scene 5 may include a scene requiring monitoring as described previously herein.

In some embodiments, incident light 3 may comprise wavelengths of ambient light, such as ambient light 1. Ambient light 1 may include light from sources external to system 100, such as natural and artificial sources. For example, ambient light 1 may include light from sources such as the Sun, streetlamps, vehicle headlights, flashlights, incandescent lights, halogen lights, and any other light source external to system 100. Ambient light 1 may include light having visible wavelengths, near-infrared wavelengths, and combinations thereof. In other embodiments, in addition to wavelengths of ambient light 1, incident light 3 may comprise wavelengths of emitted light, such as emitted light 125, emitted by light source 122 as discussed further herein.

In various embodiments, camera module 110 may be configured to generate image data corresponding with scene 5. Camera module 110 may generate image data continuously as sequential frames. The sequential frames may be presented serially to provide video data. One or more components of camera module 110 may be located in any suitable position within, or external to camera module 110. Camera module 110 may include components for receiving light, filtering light, and detecting light. For example, camera module 110 may include aperture 112, quasi-bandpass filter 114, and image sensor 116.

In various embodiments, aperture 112 may comprise a hole (e.g., opening) in a housing for receiving incident light 3. The size of aperture 112 may be fixed or variable. Aperture 112 may optically couple scene 5 with image sensor 116. A diameter of aperture 112 may be about 0.050 inches (1.27 millimeters) to about 0.250 inches (6.35 millimeters), about 0.250 inches (6.35 millimeters) to about 0.50 inches (12.7 millimeters), about 0.50 inches (12.7 millimeters) to about 1 inch (25.4 millimeters), about 1 inch (25.4 millimeters) to about 1.5 inches (38.1 millimeters), about 1.5 inches (38.1 millimeters) to about 2 inches (50.8 millimeters), or any other suitable diameter greater than about 0.050 inches (1.27 millimeters) and less than about 2 inches (50.8 millimeters), wherein the diameter is a maximum with of aperture 112, and about as used in the above contexts refers only to plus or minus 0.01 inches (0.254 millimeters).

In various embodiments, quasi-bandpass filter 114 may be configured to filter wavelengths of light. Quasi-bandpass filter 114 may comprise a static (e.g., fixed, non-moving) mechanical filter, which may be disposed in a fixed position relative to image sensor 116. For example, quasi-bandpass filter 114 may comprise an interference filter (e.g., dichroic filter), such as a thin-film interference filter. A thin-film interference filter may comprise one or more layers (e.g., films) of materials having different refractive indices configured to pass certain bands of light, attenuate other bands of light, and/or block even other bands of light. Quasi-bandpass filter 114 may be configured to filter light received by the aperture, such as received light 113, and provide filtered light, such as filtered light 115, to an image sensor 116. Filtered light 115 may include visible light and attenuated near-infrared light (light attenuated by quasi-bandpass filter 114). In other words, quasi-bandpass filter 114 may pass wavelengths of visible light and attenuate a band of wavelengths of near-infrared light. The band of wavelengths of near-infrared light attenuated by quasi-bandpass filter 114 may have a lower peak transmittance than a peak visible transmittance of the wavelengths of visible light passed through quasi-bandpass filter 114. Transmittance may be defined as a ratio of the light received by quasi-bandpass filter 114 to the light passed through quasi-bandpass filter 114. For example, a filter that passes half of an amount of light received by the filter would have a transmittance of 50%. A function of transmittance and wavelength of quasi-bandpass filter 114 may be defined by a filter transmission spectrum, such as transmission spectrum 201, as described further herein (with brief reference to FIG. 2A).

In some embodiments, and with reference to FIG. 1, quasi-bandpass filter 114 may be disposed between image sensor 116 and aperture 112. For example, incident light 3 may be received by aperture 112 and quasi-bandpass filter 114 may filter received light 113 and pass filtered light 115 to image sensor 116 for detection. In other embodiments, aperture 112 may be disposed between quasi-bandpass filter 114 and image sensor 116. For example, incident light 3 may be received by quasi-bandpass filter 114, and quasi-bandpass filter 114 may filter the received light and pass filtered light 115 to image sensor 116 for detection. In yet other embodiments, aperture 112 may encompass quasi-bandpass filter 114. That is, quasi-bandpass filter 114 may be disposed within aperture 112.

In various embodiments, camera module 110 may include other elements to aid in gathering light and detecting image data. For example, camera module 110 may include optics configured to focus filtered light 115 on image sensor 116 for detection. Because system 100 may detect visible light and near-infrared light, the optics may comprise one or more optical elements configured to minimize focal deviation between shorter wavelengths of visible light and longer wavelengths of near-infrared light. In some embodiments, the optics may comprise IR-corrected optics. IR-corrected optics may include low dispersion optical elements to compensate for varying focal points between visible light and near-infrared light. In a preferred embodiment, the optics may be configured such that filtered light 115 is focused reasonably well on image sensor 116. In other words, the optics may be configured to minimize deviation between the focal plane of visible light plane and the focal plane of near-infrared light. In addition to optics, camera module 110 may also comprise other imaging components such as a lens hood, a mechanical shutter, and the like.

In various embodiments, image sensor 116 may be configured to detect (e.g., generate, capture, etc.) raw (e.g., sensor) image data from light, such as filtered light 115. Image sensor 116 may capture image data continuously as sequential frames. The sequential frames may be presented serially to provide video data. Image sensor 116 may comprise a charge-coupled device (CCD), a complementary metal-oxide sensor (CMOS), or any other sensor suitable of detecting raw image data from light. Image sensor 116 may be configured to detect visible light and a portion of near-infrared light. That is, image sensor 116 may have a non-zero quantum efficiency in the visible spectrum and a portion of the near-infrared spectrum. Image sensor 116 may comprise a color filter array (e.g., color filter stack) configured to filter particular wavelengths of light to corresponding sites of a pixel array of image sensor 116. For example, image sensor 116 may comprise a Bayer-filter comprising red, green, and blue (RGB) color filters that filter visible wavelengths of light to specific pixels of the pixel array for image detection. As a further example, image sensor 116 may comprise a sensor sensitive to red, green, blue, and infrared light, such as an RGB-IR sensor. An RGB-IR sensor may comprise red, green, blue, and infrared color filters configured to filter visible and infrared light to specific pixels of a pixel array for image detection. An RGB-IR sensor may detect the amount of ambient near-infrared light, and an ISP may change color processing of the raw image data accordingly to improve color fidelity, as described further herein. In contrast to an RGB-IR sensor, a color image sensor may lack separate or specific pixel sensor(s) sensitive to infrared light. A range (e.g., band) of wavelengths of a portion of near-infrared light detected by a color image sensor may be less (e.g., substantially less) than a range of wavelengths of infrared light detected by an RGB-IR sensor. In embodiments, a color image sensor may detect visible light and a portion of near-infrared light via one or more same pixel sensors in an array of color pixel sensors of the image sensor. In embodiments, first image data generated in a color mode and second image data generated in in IR mode may each be generated based on light detected by at least one same pixel sensor of an image sensor. As another example, image sensor 116 may comprise a color filter array consisting of only visible color pixels.

In various embodiments, image sensor 116 may be electrically coupled to power supply 160, processor 130, and/or image signal processor (ISP) 170. For example, image sensor 116 may receive power from power supply 160, receive instructions from processor 130, provide signals corresponding with an amount of ambient light available to processor 130, and/or provide raw image data to ISP 170. Raw image data may comprise analog or digital data corresponding with light detected by image sensor 116. In various embodiments, image sensor 116 may comprise quasi-bandpass filter 114. For example, quasi-bandpass filter 114 may be directly packaged with image sensor 116.

In various embodiments, illuminator 120 may be configured to provide scene 5 with near-infrared illumination. One or more components of illuminator 120 may be located in any suitable position within, or external to, illuminator 120. For example, in some embodiments camera module 110 may comprise one or more components of illuminator 120. In various embodiments, illuminator 120 may comprise a light source 122 and a photodetector 124.

Light source 122 may comprise an emitter capable of emitting a predetermined band of light, such as a light emitting diode (LED), laser, or any other suitable emitter. Light source 122 may be electrically coupled with power source 160 and/or processor 130. According to an operating mode of system 100, light source 122 may be configured to emit light, such as emitted light 125. For example, in IR mode, light source 122 may receive power from power supply 160 and emit emitted light 125. In IR mode, processor 130 may enable power supply 160 to provide power to light source 122 and/or provide power directly to light source 122

An emission band of emitted light 125, such as emission band 220 may comprise a near-infrared band (with brief reference to FIG. 2B). Emission band 220 may overlap a near-infrared band attenuated by quasi-bandpass filter 114, such as near-infrared band 210. Emission band 220 may overlap a portion of an atmospheric absorption band as described further herein. In this manner, some emitted light 125 may be attenuated by quasi-bandpass filter 114, and some emitted light 125 may be passed through quasi-bandpass filter 114. A function of emittance and wavelength of light source 122 may be defined by an emission spectrum, such as emission spectrum 221 as described further herein (with brief reference to FIG. 2B).

In various embodiments, light source 122 may comprise a peak output power. For example, a peak output power of light source 122 may be between 100 milliwatts to 200 milliwatts, between 200 milliwatts to 400 milliwatts, between 400 milliwatts to 800 milliwatts, between 800 milliwatts to 1,500 milliwatts, between 1,500 milliwatts to 3,000 milliwatts, between 3,000 milliwatts to 10,000 milliwatts or any other suitable peak power between 100 milliwatts and 10,000 milliwatts. In other embodiments, the peak output power may be between 700 milliwatts and 1,000 milliwatts. In response to the amount of ambient light detected (e.g., the amount of ambient visible light detected), the power output of light source 122 may be adjusted by processor 130.

In various embodiments, light source 122 may comprise a peak radiant intensity. For example, a peak radiant intensity of light source 122 may be between 50 milliwatts per steradian and 70 milliwatts per steradian, between 70 milliwatts per steradian and 90 milliwatts per steradian, between 90 milliwatts per steradian and 150 milliwatts per steradian, and between 150 milliwatts per steradian and 1,000 milliwatts per steradian, or any other suitable peak radiant intensity between 50 milliwatts per steradian and 1,000 milliwatts per steradian.

In various embodiments, system 100 may be mounted in an interior of a vehicle. Aperture 112 may be oriented toward the interior of the vehicle. Light source 122 may be directed at an individual in the interior cabin. Light source 122 may be disposed proximate eyes of the individual, therefore, a peak radiant intensity of light source 122 may be configured to be less than an infrared radiation hazard exposure limit for the eye, as defined per the International Electrotechincal Commission (IEC) 62471 guidelines on photobiological safety of lamps and lamp systems.

In some embodiments, a sensor, such as photodetector 124, may be configured to detect an amount of ambient light available. Photodetector 124 may be configured to detect an amount (e.g., power, intensity, illuminance, etc.) of ambient light by converting photons into electrical current. Photodetector 124 may comprise devices such as photoresistors (e.g., cadmium sulfide photocells, cadmium selenium photocells, etc.), photodiodes, phototransistors, etc. Photodetector 124 may comprise photoelectric sensors, semiconductor sensors, photovoltaic cells, thermal sensors, photochemical sensors, or any other suitable sensor configured to detect available light. Photodetector 124 may be electrically coupled to processor 130 and report a signal corresponding to the amount of ambient light (e.g., the amount of ambient light available) to processor 130.

In various embodiments, photodetector 124 may only be sensitive to visible light, such that the signal detected by photodetector 124 corresponds with an amount of ambient visible light available. In this manner, when light source 122 is active, emitted light 125 will not contribute to the amount of ambient light detected by photodetector 124. For example, photodetector 124 may comprise a filter to block a band of near-infrared light corresponding with the band of near-infrared light emitted by light source 122.

In other embodiments, image sensor 116 may perform the functions of photodetector 124. For example, image sensor 116 may report a signal corresponding with an amount (e.g., power, intensity, illuminance, etc.) of ambient light available to processor 130. However, because image sensor 116 is sensitive to near-infrared light, emitted light 125 may contribute to the amount of ambient light detected by image sensor 116. In some embodiments, to overcome this, when active, light source 122 may be rapidly switch on and off, and image sensor 116 may be configured to report a signal corresponding with an amount of ambient light available during the off pulse, such that the signal does not correspond with an amount of emitted light 125. In other embodiments, if the gain of image sensor 116 exceeds a reference value, such as for example, 20×, 25×, or 30× (signifying additional illumination may be necessary), light source 122 may be activated. Once light source 122 is activated, as the gain of image sensor 116 decreases below a reference value, such as for example 10× or 15× (signifying additional illumination may no longer be necessary), light source 122 may be deactivated.

In various embodiments, a processing circuit, such as processor 130, may comprise any circuitry, electrical components, electronic components, software, and/or the like configured to perform various operations and functions discussed herein. For example, processor 130 may comprise a processing circuit, a processor, a digital signal processor, a microcontroller, a microprocessor, an application specific integrated circuit (ASIC), a programmable logic device, logic circuitry, state machines, MEMS devices, signal conditioning circuitry, communication circuitry, a computer, a computer-based system, a radio, a network appliance, a data bus, an address bus, an encoder, and/or any combination thereof. In various embodiments, processor 130 may include passive electronic devices (e.g., resistors, capacitors, inductors, etc.) and/or active electronic devices (e.g., op amps, comparators, analog-to-digital converters, digital-to-analog converters, programmable logic, SRCs, transistors, etc.). In various embodiments, processor 130 may include data buses, output ports, input ports, timers, memory, arithmetic units, and/or the like.

Processor 130 may be configured to provide and/or receive electrical signals whether digital and/or analog in form. Processor 130 may provide and/or receive digital information via a data bus using any protocol. Processor 130 may receive information, manipulate the received information, and provide the manipulated information. Processor 130 may store information and retrieve stored information. Information received, stored, and/or manipulated by processor 130 may be used to perform a function, control a function, and/or to perform an operation or execute a stored program.

Processor 130 may control the operation and/or function of other circuits and/or components of system 100. Processor 130 may receive status information regarding the operation of other components, perform calculations with respect to the status information, and provide commands (e.g., instructions) to one or more other components. Processor 130 may command another component to start operation, continue operation, alter operation, suspend operation, cease operation, or the like. Commands and/or status may be communicated between processor 130 and other circuits and/or components via any type of bus (e.g., SPI bus) including any type of data/address bus. In various embodiments, processor 130 may be electronically and/or electrically coupled to image sensor 116. Processor 130 may be configured to receive a signal reported by image sensor 116 corresponding with an amount of ambient light detected by image sensor 116. Processor 130 may determine an ambient lighting condition from the signal received by image sensor 116. For example, processor 130 may determine an ambient lighting condition by comparing the signal with a predetermined reference value. In response to determining the ambient lighting condition, processor 130 may be configured to perform various operations and/or functions, as discussed further herein.

In various embodiments, processor 130 may be electronically and/or electrically coupled to photodetector 124. Processor 130 may be configured to receive a signal reported by photodetector 124 corresponding with an amount of ambient light detected by photodetector 124. Processor 130 may determine an ambient lighting condition from the signal received by photodetector 124. For example, processor 130 may determine an ambient lighting condition by comparing the signal with a predetermined reference value. In response to determining the ambient lighting condition, processor 130 may be configured to perform various operations and/or functions, as discussed further herein. In embodiments, processor 130 may be configured to perform one or more operations of method 300, with brief reference to FIG. 3.

In various embodiments, processor 130 may be electronically and/or electrically coupled to light source 122. In response to determining the ambient lighting condition, processor 130 may be configured to provide a control signal to light source 122 and/or power supply 160 corresponding with an operating mode of system 100. For example, in response to determining a first ambient lighting condition from a first amount of detected light, processor 130 may provide a control signal to enable an electrical current to flow from power supply 160 to light source 122, thereby activating light source 122.

In various embodiments, processor 130 may be electrically and/or electronically coupled to power supply 160. Processor 130 may receive power from power supply 160. The power received from power supply 160 may be used by processing circuit 130 to receive signals, process signals, and transmit signals to various other components in system 100. Processor 130 may use power from power supply 160 to detect an ambient lighting condition and generate one or more control signals in response to the detected ambient lighting condition. The control signal may be based on the ambient lighting condition. The control signal may be an electrical signal. The control signal may correspond with an operating mode of system 100. The control signal may be provided to components of system 100, such as image sensor 116, light source 122, ISP 170, and/or encoder 140.

In various embodiments, processor 130 may comprise a system on a chip having functionality of an image processor configured to perform a range of tasks related to image processing. One or more components of processor 130 may be located in any suitable position within, or external to, processor 130. In various embodiments, processor 130 may comprise an image signal processor (ISP) 170 and/or an encoder 140.

In various embodiments, ISP 170, may comprise any circuitry, electrical components, electronic components, software, and/or the like configured to perform various operations and functions discussed herein. For example, ISP 170 may comprise a processing circuit, a processor, a digital signal processor, a microcontroller, a microprocessor, an application specific integrated circuit (ASIC), a programmable logic device, logic circuitry, state machines, MEMS devices, signal conditioning circuitry, communication circuitry, a computer, a computer-based system, a radio, a network appliance, a data bus, an address bus, an encoder, and/or any combination thereof. In various embodiments, ISP 170 may include passive electronic devices (e.g., resistors, capacitors, inductors, etc.) and/or active electronic devices (e.g., op amps, comparators, analog-to-digital converters, digital-to-analog converters, programmable logic, SRCs, transistors, etc.). In various embodiments, processor 130 may include data buses, output ports, input ports, timers, memory, arithmetic units, and/or the like.

ISP 170 may be configured to provide and/or receive electrical signals whether digital and/or analog in form. ISP 170 may provide and/or receive digital information via a data bus using any protocol. ISP 170 may receive information, manipulate the received information, and provide the manipulated information. ISP 170 may store information and retrieve stored information. Information received, stored, and/or manipulated by ISP 170 may be used to perform a function, control a function, and/or to perform an operation or execute a stored program.

In various embodiments, ISP 170 may be electronically and/or electrically coupled to image sensor 116. ISP 170 may receive raw image data from image sensor 116 and perform various image signal processing tasks on the raw image data, such as Bayer transformations, demosaicing, noise reduction, image sharpening, filtering, lens distortion correction, autofocus, autoexposure, auto white balance processing, high dynamic range processing, color correction, etc.

In addition to default auto white balance processing, ISP 170 may perform partial white balance processing to improve color fidelity under certain lighting conditions (e.g., conditions in which ambient light 1 comprises light emitted from incandescent light sources, such as halogen headlights and/or halogen streetlamps). Image data generated under incandescent (e.g., halogen) light sources, which have high emission in the near-infrared band and low emission in the visible blue band, may require additional color processing to correct for color errors and produce a balanced color (e.g., neutral) image. Because quasi-bandpass filter 114 passes an attenuated band of near-infrared light, the near-infrared light emitted by halogen sources may bias the colors of the image toward warmer colors. Under halogen lighting conditions, ISP 170 may apply default white balance processing, in which a stronger gain in the blue and/or green color channels is applied to adjust the color balance such that images appear neutral. For example, target gains under default white balance processing for halogen lighting conditions may include 1× for the red color channel, 2× for the green color channel, and 5× for the blue color channel. Alternatively, under halogen lighting conditions, ISP 170 may apply partial white balance processing, in which a weaker gain in the blue and/or green color channels relative to the gain for the blue and/or green color channels applied in default white balance processing, may be applied, thereby resulting in warmer (e.g., non-neutral) images. For example, target gains under partial white balance processing may include 1x for the red color channel, 1.5× for the green color channel, and 2.5× for the blue color channel. In some instances, warmer, non-neutral images may be preferable to neutral and/or cooler images.

In embodiments in which image sensor 116 comprises an RGB-IR image sensor, ISP 170 may use raw image data from the sensor to change the color processing accordingly to minimize any unwanted effects on color reproduction attributed to near-infrared light. That is, ISP 170 may apply color correction in accordance with infrared data received by the RGB-IR image sensor to improve color fidelity under various lighting conditions. In addition to partial white balance processing ISP 170 and/or processor 130 may further perform other image processing, including desaturating at least one color as further discussed herein.

In various embodiments, ISP 170 may apply color corrections and/or color conversions corresponding with an operating mode of system 100. For example, in color mode, ISP 170 may apply color corrections to best reproduce visible colors and improve color fidelity. As another example, in monochrome mode, ISP 170 may apply color conversions to convert the raw image data into a grayscale format.

In various embodiments, ISP 170 may be electronically and/or electrically coupled to encoder 140. After performing various image signal processing tasks on the raw image data received by image sensor 116, ISP 170 may transmit the processed image data to encoder 140 for encoding to memory 150. In various embodiments, ISP 170 may include the functions of encoder 140 and/or processor 130.

In various embodiments, ISP 170 may be electronically and/or electrically coupled to processor 130. In response to determining an ambient lighting condition, processor 130 may provide instructions to ISP 170 to encode image data received by image sensor 116 in a specified mode. For example, in response to determining a first ambient lighting condition, processor 130 may be configured to provide instructions to ISP 170 to encode image data in a first mode corresponding with a first operating mode system 100. As another example, in response to determining a second ambient lighting condition, processor 130 may provide instructions to encoder 140 to encode image data in a second mode, corresponding with a second operating mode of system 100.

In various embodiments, encoder 140 may comprise any electrical components, electronic components, software, and/or the like configured to perform various operations and functions discussed herein. For example, encoder 140 may comprise a processing circuit, a processor, a digital signal processor, a microcontroller, a microprocessor, an application specific integrated circuit (ASIC), a programmable logic device, logic circuitry, state machines, MEMS devices, signal conditioning circuitry, communication circuitry, a computer, a computer-based system, a radio, a network appliance, a data bus, an address bus, an encoder, and/or any combination thereof. In various embodiments, encoder 140 may include passive electronic devices (e.g., resistors, capacitors, inductors, etc.) and/or active electronic devices (e.g., op amps, comparators, analog-to-digital converters, digital-to-analog converters, programmable logic, SRCs, transistors, etc.). In various embodiments, encoder 140 may include data buses, output ports, input ports, timers, memory, arithmetic units, and/or the like.

Encoder 140 may be configured to provide and/or receive electrical signals whether digital and/or analog in form. Encoder 140 may provide and/or receive digital information via a data bus using any protocol. Encoder 140 may receive information, manipulate the received information, and provide the manipulated information. Encoder 140 may store information and retrieve stored information. Information received, stored, and/or manipulated by encoder 140 may be used to perform a function, control a function, and/or to perform an operation or execute a stored program In various embodiments, encoder 140 may be configured to encode processed image data received by ISP 170 in a coding format, such as MPEG-2 (H.262), MEPG-4 (H.264), HEVC (H.265), AOMedia Video 1 (AV1), etc. Encoder 140 may be configured to encode the processed age data in a specified mode, such as color, black and white, monochrome, grayscale, etc. Encoder 140 may convert a sequence of image data (e.g., processed image data) over time into video data.

In various embodiments, encoder 140 may be electronically and/or electrically coupled to, processor 130, memory 150, ISP 170, and/or power supply 160. Encoder 140 may be configured to receive image data from ISP 170. Encoder 140 may be configured to encode image data processed by ISP 170 to memory 150. Encoder 140 may be configured to receive a control signal from processor 130 corresponding with an operating mode of system 100. For example, encoder 140 may receive a control signal from processor 130 instructing encoder 140 to encode image data in a specified mode, in accordance with an operating mode of system 100. For example, in a first operating mode of system 100, encoder 140 may receive a first control signal from processor 130 to encode image data in monochrome to memory 150. Encoder 140 may encode the image data using a monochrome image file format (e.g., first data format) in accordance with the first control signal. As another example, in a second operating mode of system 100, encoder receive a second control signal from processor 130 to encode image data in color to memory 150. Encoder 140 may encode the image data using a color image file format (e.g., second data format, different from a first data format) in accordance with the second control signal.

In various embodiments, encoder 140 may be electrically and/or electronically coupled to power supply 160. Encoder 140 may receive power from power supply 160. The power received from power supply 160 may be used by encoder 140 to receive signals, process signals, and transmit signals to various other components in system 100. For example, encoder 140 may use power from power supply 160 to encode processed image data to memory 150.

In various embodiments, memory 150 may be configured to store data for later access by a computing device. In various embodiments, memory 150 may comprise a computer readable medium, such as flash memory, random access memory (RAM), hard disks drives, or any other suitable medium for storing data. Memory 150 may be electrically coupled to image sensor 116, processor 130, encoder 140, ISP 170, and/or power supply 160. For example, memory 150 may be electrically and/or electronically coupled with encoder 140 and configured to store encoded image data received by encoder 140.

In various embodiments, power supply 160 may be configured to provide power to various components of system 100. For example, power supply 160 may provide energy for operating the electronic and/or electrical components (e.g., parts, subsystems, circuits) of system 100, camera module 110, and/or illuminator 120. Power supply 160 may provide electrical power. Providing electrical power may include providing a current at a voltage. Power supply 160 may be electrically coupled to illuminator 120 (e.g., light source 122), processor 130, encoder 140, ISP 170, and/or image sensor 116. Electrical power from power supply 160 may be provided as a direct current ("DC"). Electrical power from power supply 160 may be provided as an alternating current ("AC"). Power supply 160 may include a battery. The energy of power supply 160 may be renewable or exhaustible, and/or replaceable. For example, power supply 160 may comprise one or more rechargeable or disposable batteries. In various embodiments, the energy from power supply 160 may be converted from one form (e.g., electrical, magnetic, thermal) to another form to perform the functions of a system. In various embodiments, power supply 160 may include power provided by a vehicle.

With reference to FIG. 2A, a filter transmission spectrum, such as transmission spectrum 201, of quasi-bandpass filter 114 is disclosed. Transmission spectrum 201 may comprise transmittance values plotted against corresponding wavelength values. Transmission spectrum 201 may comprise one or more bands. A band may comprise a bandwidth and a peak transmittance, wherein the bandwidth is a full width of the band measured at half of the peak transmittance. A band may include a center wavelength, wherein the center wavelength is measured at half of the peak transmittance. For example, transmission spectrum 201 may include a visible band 200 and a near-infrared band 210 as discussed further herein.

In various embodiments, visible band 200 of transmission spectrum 201 may comprise a visible peak transmittance 202, and a visible bandwidth 204. Visible peak transmittance 202 may be defined as a peak transmittance value of visible bandwidth 204. Visible peak transmittance 202 may be 100%, or as close to 100% as manufacturing allows. For example, visible peak transmittance 202 may be about 80% to about 85%, about 85% to about 90%, about 90% to about 95%, about 95% to about 100%, or any other suitable transmittance greater than about 80%, wherein about as used in the above contexts refers only to plus or minus 1%.

Visible band 200 may be configured to overlap the visible spectrum. For example, visible bandwidth 204 may be between about 380 nanometers and about 650 nanometers, or between about 380 nanometers and about 740 nanometers, wherein about as used in the above contexts refers only to plus or minus 20 nanometers.

In various embodiments, near-infrared band 210 of transmission spectrum 201 may comprise a near-infrared peak transmittance 212, a near-infrared bandwidth 214, and a near-infrared center wavelength 216. Near-infrared peak transmittance 212 may be defined as a peak transmittance value of near-infrared bandwidth 214. In various embodiments, near-infrared peak transmittance 212 may be between about 1% and about 5%, between about 5% and about 10%, between about 10% and about 15%, between about 15% and about 20%, between about 20% and about 25%, between about 25% and about 30%, between about 30% and about 35%, between about 35% and about 40%, between about 40% and about 45%, between about 45% and about 50%, or any other suitable transmittance greater than about 1% and less than about 50%, wherein about as used in the above contexts refers only to plus or minus 1%. Near-infrared peak 212 transmittance may be less than 50% to reduce negative impact of near-infrared light on image quality, while still allowing some emitted light 125 to reach image sensor 116 as discussed herein. In various embodiments, near-infrared peak transmittance 212 may be greater than about 1% peak visible transmittance 202 and less than about 50% of peak visible transmittance 202. In various embodiments, near-infrared peak transmittance 212 may be between about 10% and about 20%.

In various embodiments, near-infrared band 210 may overlap an atmospheric absorption band, such as a near-infrared atmospheric absorption band. An atmospheric absorption band is a band in the solar spectrum in which energy is lost due to absorption of energy by gases in Earth's atmosphere. As sunlight passes through Earth's atmosphere, energy is lost due to absorption by atmospheric gases such as water vapor, carbon dioxide, and oxygen. The absorption by atmospheric gasses attenuates portions of the solar spectrum, creating absorption bands (e.g., absorption holes) in the solar spectrum. Several atmospheric absorption bands exist in the near-infrared region that are attributed to water vapor and include: the 0.8μ. (0.8 mu) band having a center wavelength of approximately 815 nanometers and a bandwidth of approximately 50 nanometers; the ρστ (rho sigma tau) band having a center wavelength of approximately 952 nanometers and a bandwidth of approximately 52 nanometers; the φ, (phi) band having a center wavelength of approximately 1130 nanometers and a bandwidth of approximately 70 nanometers; the ψ (psi) band having a center wavelength of approximately 1409 nanometers and a bandwidth of approximately 179 nanometers; the Ω, (omega) band having a center wavelength of approximately 1870 nanometers and a bandwidth of approximately 215 nanometers; the χ (chi) band having a center wavelength of approximately 2683 nanometers and a bandwidth of approximately 325 nanometers; and the 6.3μ (6.3 mu) or χ' (chi prime) band having a center wavelength of approximately 3280 nanometers and a bandwidth of approximately 580 nanometers. Therefore, the intensity of sunlight having wavelengths in the 0.8μ, ρστ, φ, ψ, Ω, χ, and 6.3μ bands is less on the surface of the Earth relative to the intensity of visible light that reaches the surface of the Earth, due to attenuation by atmospheric gases.

In various embodiments, near-infrared band 210 may be configured to overlap the ρστ atmospheric absorption band. For example, near-infrared band 210 may comprise: a near-infrared center wavelength 216 between 935 nanometers and 940 nanometers, between 940 nanometers and 945 nanometers, between 945 nanometers and 950 nanometers, or between 950 nanometers and 955 nanometers, or any suitable center wavelength between 935 nanometers and 955 nanometers; and a near-infrared bandwidth 214 between 35 nanometers and 40 nanometers, between 40 nanometers and 45 nanometers, between 45 nanometers and 50 nanometers, between 50 nanometers and 55 nanometers, between 55 nanometers and 60 nanometers, or between 60 nanometers and 65 nanometers, or any suitable bandwidth between 35 nanometers and 65 nanometers.

As another example, near-infrared band 210 may be configured to overlap the 0.8μ band. For example, near-infrared band 210 may comprise: a near-infrared center wavelength 216 between 790 nanometers and 800 nanometers, between 800 nanometers and 810 nanometers, between 810 nanometers and 820 nanometers, or between 820 nanometers and 830 nanometers, or any suitable center wavelength between 790 nanometers and 830 nanometers; and a near-infrared bandwidth 214 between 35 nanometers and 40 nanometers, between 40 nanometers and 45 nanometers, between 45 nanometers and 50 nanometers, between 50 nanometers and 55 nanometers, and between 55 nanometers and 60 nanometers, or any suitable bandwidth between 35 nanometers and 60 nanometers.

As a further example, near-infrared band 210 may be configured to overlap the φ band. For example, near-infrared band 210 may comprise: a near-infrared center wavelength 216 between 1000 nanometers and 1050 nanometers, between 1050 nanometers and 1100 nanometers, between 1100 nanometers and 1150 nanometers, and between 1150 nanometers and 1200 nanometers, or any suitable center wavelength between 1000 nanometers and 1200 nanometers; and a near-infrared bandwidth 214 between 40 nanometers and 50 nanometers, between 50 nanometers and 60 nanometers, between 60 nanometers and 70 nanometers, between 70 nanometers and 80 nanometers, or between 80 nanometers and 90 nanometers, or any suitable bandwidth between 40 nanometers and 90 nanometers.

In various embodiments, near-infrared band 210 and visible band 200 may be discrete bands. For example, transmission spectrum 201 may further comprise a blocking band 218, separating visible band 200 and near-infrared band 210. Blocking band 218 may be disposed between near-infrared band 210 and visible band 200. Blocking band 218 may be configured to block wavelengths of light between visible band 200 and near-infrared band 210. A peak transmittance of blocking band 218 may be configured to be 0% or as close to 0% as manufacturing allows. Blocking band 218 may be configured to block ambient light 1, but not emitted light 125.

With reference to FIG. 2B, an emission spectrum, such as emission spectrum 221, of light source 122 is disclosed. Emission spectrum 221 may comprise relative intensity values plotted against corresponding wavelength values. Emission spectrum 221 may comprise an emission band, such as emission band 220 having a bandwidth and a peak relative intensity, wherein the bandwidth is a full width of the band measured at half of the peak relative intensity. For example, emission band 220 may include a peak relative intensity 222 and an emission bandwidth 224. Emission band 220 may include an emission center wavelength, such as emission center wavelength 226, wherein the emission center wavelength is measured at half of the peak relative intensity.

In various embodiments, emission band 220 may overlap near-infrared band 210. Emission band center wavelength 226 may be centered about near-infrared center wavelength 216. For example, emission center wavelength 226 may be about equal to near-infrared center wavelength 216, wherein about as used in the above context refers only to plus or minus 5 nanometers. Emission band 220 may comprise a portion of near-infrared band 210. In various embodiments, emission band center wavelength 226 may be about 940 nanometers, about 950 nanometers, or about 960 nanometers wherein about as used in the above context refers to plus or minus 5 nanometers.

In various embodiments, emission bandwidth 224 may be equal to or less than near-infrared bandwidth 214. For example, emission bandwidth 224 may be less than near-infrared bandwidth 214 by 5 nanometers, 10 nanometers, 15 nanometers, 20 nanometers, 25 nanometers, or any other suitable difference such that emission bandwidth 224 is contained by near-infrared bandwidth 214. In some embodiments, emission bandwidth 224 may be greater than near-infrared bandwidth 214. In embodiments, emission bandwidth 224 may be between about 30 nanometers, about 40 nanometers, about 50 nanometers, about 60 nanometers, about 70 nanometers, or about 80 nanometers wherein about as used in the above context refers to plus or minus 5 nanometers.

FIG. 3 is a flowchart that illustrates an exemplary embodiment of a method, such as method 300, of operating a dual mode camera having a quasi-bandpass filter according to various aspects of the present disclosure. One of ordinary skill in the art will recognize that, although a method of operating a dual mode camera having a quasi-bandpass filter is illustrated and described, other devices for capturing image data that have a quasi-bandpass filter, such as quasi-bandpass filter 114, could also be operated using a similar method. In various embodiments, one or more operations of method 300 may be performed by a dual-mode camera comprising a quasi-bandpass filter. For example, one or more operations of method 300 may be performed by dual mode camera system 100 with brief reference to FIG. 1. The one or more operations may be performed by components of the dual mode camera, including components further discussed above with regards to system 100.

In embodiments according to various aspects of the present disclosure, generating image data may comprise various operations. For example, operations of method 300 performed by a dual mode camera system may comprise one or more of receiving incident light 302, passing visible light of the incident light through a quasi-bandpass filter to an image sensor 304, attenuating a portion of near-infrared light of the incident through a quasi-bandpass filter to an image sensor 306, generating image data 308, detecting an amount of ambient light 310, determining a first ambient lighting condition 312, determining a second ambient lighting condition 322, activating a light source 314, deactivating a light source 324, applying first image processing 316, encoding image data in monochrome 318, applying second image processing 326, and encoding image data in color 328. In embodiments, one or more operations may be selectively performed in accordance with an amount of ambient light detected by detecting an amount of ambient light 310. In embodiments, one or more example operations may be performed independent of the amount of ambient light detected by detecting an amount of ambient light 310 and/or prior to detecting an amount of ambient light 310.

From a start block, method 300 may proceed to receiving incident light 302. Receiving incident light 302 may include receiving ambient light. Receiving incident light 302 may comprise receiving the ambient light via an aperture. For example, receiving incident light 302 may include system 100 receiving incident light, such as incident light 3. Incident light 3 may be received by aperture 112 of camera module 110. Incident light 3 may comprise ambient light 1 reflected by scene 5. In some embodiments ambient light 1 may include emitted light 125 emitted by light source 122. After incident light 3 is received, the incident light may be provided to (e.g., received by) a quasi-bandpass filter.

In embodiments, passing visible light of the incident light through a quasi-bandpass filter 304 may be performed. For example, quasi-bandpass filter 114 may pass visible light of incident light 3. The visible light may be passed to an image sensor. For example, quasi-bandpass filter 114 may pass incident light 3 to image sensor 116 for detection. Passing the visible light may comprise passing the visible light unattenuated, such that ambient visible light received by an aperture of a camera system is further received by an image sensor, while wavelengths of incident light above and below wavelengths of the visible light are attenuated. In embodiments, second image data may be subsequently generated based on (in accordance with, corresponding to, etc.) the passed visible light.

In embodiments, attenuating a portion of near-infrared light of incident light 306 may be performed. The portion of near-infrared light may be attenuated by a quasi-bandpass filter. For example, a portion of near-infrared light of incident light 3 may be attenuated through quasi-bandpass filter 114 and passed to image sensor 116 for detection. In embodiments, first image data may be subsequently generated based on (in accordance with, corresponding to, etc.) the attenuated portion of near-infrared light.

In embodiments, passing visible light of the incident light through a quasi-bandpass filter 304 and attenuating a portion of near-infrared light of incident light 306 may be performed concurrently. The passing and attenuating may be performed by a same quasi-bandpass filter. The passing and attenuating may be performed independent of a mode of a camera system. For example, the passing and attenuating may be performed for each of generating first image data under a first ambient lighting condition and generating second image data under a second ambient lighting condition. First image data may be subsequently generated based on the attenuated portion of near-infrared light, despite an amount of passed visible light. Second image data may be generated from the passed visible light, despite the attenuated portion of near-infrared light being concurrently received.

In embodiments, generating image data 308 may be performed. Generating image data 308 may comprise generating raw image data. The raw image data may be generated by an image sensor. The raw image data may be generated from filtered light. For example, and with brief reference to FIG. 1, image sensor 116 may receive filtered light 115 and generate raw image data in accordance with a respective level of one or more wavelengths of filtered light 115 detected by image sensor 116. The image data may indicate a level of the one or more wavelengths of filtered light sensed by a plurality of pixels sensors of image sensor 116. Generating image data 308 may comprise detecting the image data based on the level(s) of one or more wavelengths of filtered light received by an image sensor.

In embodiments, generating image data 308 may comprise receiving image data at a component of the dual mode camera system. The component may comprise a processor of the dual mode camera system. The data may be received from an image sensor of the dual mode camera system. For example, processor 130 may be configured to perform operations comprising receiving image data from image processor 116 with brief reference to FIG. 1. Generating image data 308 may comprise receiving, by a processor, raw image data from an image sensor. In embodiments, the raw image data may be received by an ISP of the processor.

At this point, detecting an amount of ambient light 310 may be performed, wherein an amount of ambient light may be detected. The ambient light may comprise ambient visible light. In various embodiments, the detected amount of ambient visible light available may correspond with an electrical signal having a voltage and/or current. In some embodiments, the electrical signal may be generated by a photodetector (e.g., photodetector 124) in response to the amount of ambient visible light available. In other embodiments, the electrical signal may be generated by image sensor 116 in response to the amount of ambient visible light available. In various embodiments, an electrical signal corresponding with the amount of ambient light detected may be reported to (e.g., received by) processor 130. Detecting the amount of ambient light 310 may comprise detecting a first amount of ambient light. Detecting the amount of ambient light 310 may comprise detecting a second amount of ambient light, different from the first amount of ambient light. In embodiments, the first amount may be detected when the detected amount of ambient light is less than a reference value and the second amount may be detected when the detected amount of ambient light is equal or greater than the reference value. Method 300 may proceed to block 312 in response to a first amount of ambient light detected. Method 300 may proceed to block 322 in response to a second amount of ambient light detected, where the second amount of ambient light detected is greater than the first amount of light detected.

In response to a first amount of ambient light detected, determining a first ambient lighting condition 312 may be performed to enable first image data to be generated. The first image data may comprise color image data. Determining the first ambient lighting condition 312 may comprise placing the camera in a predetermined first mode. For example, and in accordance with detecting 310, a first ambient lighting condition may cause an operating mode of system 100 to be applied. The operating mode may comprise an IR mode. For example, processor 130 may receive a first electrical signal related to the first amount of ambient light detected. In response to the first electrical signal, processor 130 may then determine a first ambient lighting condition, wherein the first ambient lighting condition may correspond with an IR mode.

In accordance with determining a first lighting condition, activating a light source 314 may be performed to provide additional light to a scene. Activating a light source may comprise controlling an illuminator. For example, light source 122 may be activated and/or adjusted. In embodiments, activating a light source 314 may be performed by a processor in communication with the light source. For example, in response to determining a first ambient lighting condition, processor 130 may send a first control signal to power supply 160 and/or light source 122 to activate light source 122. If light source 122 is already activated, method 300 may skip block 313. As another example, in response to detecting another ambient lighting condition, processor 130 may send a control signal to power supply 160 and/or light source 122 to adjust the power output of light source 122 in accordance with the amount of ambient light detected.

In embodiments, and responsive to determining first ambient lighting condition, generating first image data may be performed. Generating the first image data may comprise one or more of applying first image processing 316 or encoding image data in monochrome 318. Generating the first image data may comprise generating the first image data based on a band of attenuated wavelengths of near-infrared light. As indicated by the first lighting condition, an insufficient amount of ambient visible light may be available, precluding image data from being generated based on the ambient visible light. However, wavelengths of ambient near-infrared light may be available to yet enable visual information to be detected via these wavelengths and recorded in subsequently generated second image data.

In embodiments, applying first image processing 316 may comprise adjusting the image data. The image data may comprise image data generated by an image sensor in accordance with generating image data 308. The first image processing may comprise a default image processing. For example, a default automatic white balancing may be applied to generated image data. The default image processing may comprise one or more adjustments to the image data independent of the lighting condition detected in accordance with detecting an amount of ambient light available 310. For example, default image processing may comprise noise filtering to reduce a pixilation of image data, independent of a lighting condition under which the image was generated. Applying first image processing 316 to the image data may generate processed image data.

In embodiments, encoding image data in monochrome 318 may be performed. The image data may comprise processed image data provided as a result of applying first image processing 316 to image data. Encoding image data in monochrome 318 may comprise encoding image data in a first mode. The first mode may be a monochrome mode. The monochrome mode may be an operating mode of an encoder or processor. For example, in response to determining a first ambient lighting condition and activating light source 122, processor 130 may send another control signal to encoder 140 and/or ISP 170 to process and encode image data received by image sensor 116 in monochrome. In embodiments, encoding image data in monochrome 318 may further comprise recording the encoded image data (e.g., monochrome image data) in a non-transitory, computer-readable storage medium. In embodiments, method 300 may loop back to receiving incident light 302 and wait for a subsequent amount of incident light to be received. Alternately, method 300 may end after operations of blocks 312-318 have been completed.

Returning to decision block 310, and in response to a second amount of ambient light detected, determining a second ambient lighting condition 322 may be performed to enable second image data to be generated. The second image data may comprise monochrome image data. Determining the first ambient lighting condition may comprise placing the camera in a predetermined second mode. For example, and in accordance with detecting 310, a second ambient lighting condition may cause another operating mode of system 100 to be applied. The other operating mode may comprise a color mode. For example, processor 130 may receive a second electrical signal corresponding with a second amount of ambient light detected by photodetector 124 and/or image sensor 116. In response to the second electrical signal, processor 130 may then determine a second ambient lighting condition, wherein the second ambient lighting condition may correspond with a color mode.

In accordance with determining a second lighting condition, deactivating a light source 324 may be performed to remove additional light from a scene. For example, light source 122 may be deactivated in accordance with deactivating a light source 324. In embodiments, deactivating a light source 324 may be performed by a processor in communication with the light source. For example, in response to determining a second ambient lighting condition, processor 130 may send a second control signal to power supply 160 and/or light source 122 to deactivate light source 122. If light source 122 is already deactivated, method 300 may skip block 324.

In embodiments, and responsive to determining second ambient lighting condition, generating second image data may be performed. Generating the second image data may comprise one or more of applying second image processing 326 or encoding image data in color 328. Generating the second image data may comprise generating the second image data based on wavelengths of visible light. As indicated by the second lighting condition, a sufficient amount of ambient visible light may be available to enable image data to be generated based on the ambient visible light. Wavelengths of ambient near-infrared light may also be available; however, visual information may be detected via the wavelengths of visible light to enable color image data to be generated.

In embodiments, applying second image processing 326 may be performed. Applying image processing 326 may be performed to correct image errors associated with receiving both visible light and near-infrared light at a sensor. For example, permitting a band of near-infrared wavelengths to be received by an image sensor may cause errors in image data generated by the image sensor. Permitting the band of near-infrared wavelengths to be received by the image sensor may enable visual information to be captured under a first ambient lighting condition, but cause such errors in an accuracy of visual information captured in a second ambient lighting condition using a same image sensor. For example, one or more colors in generated image data may be inaccurate relative to one or more colors represented in visible light received by an image sensor. A quasi-bandpass filter may enable accurate capture of visual information in image data under a dimmer ambient visible lighting condition (e.g., lighting condition in which ambient visible light is relatively decreased), but cause one or more colors captured in image data under a visibly brighter ambient lighting condition (e.g., lighting condition in which ambient visible light is relatively increased) to be inaccurate (e.g., false). Applying second image processing 326 may enable accurate image data to be captured by a same element or combination same elements (e.g., a filter and/or image sensor) for each of these different lighting conditions in which a camera may be operated. Using a static filter to permit non-infrared light may cause an imaging error in raw image data generated under a second ambient lighting condition, despite the non-infrared light being attenuated. Yet, this imaging error may be corrected by applying second image processing 326. Applying second image processing 326 may enable the static filter to remain usable for passing near-infrared light to generate first image data under a first ambient lighting condition, despite an imaging error initially introduced in second image data when the second image data is captured under the second lighting condition.

In embodiments, applying second imaging processing 326 may be performed by a processor. For example, and with brief reference to FIG. 1, processor 130 may perform operations comprising applying second image processing 326. The applying may be performed by an ISP of the processing according to various aspects of the present disclosure. For example, ISP 170 may perform operations comprising applying second image processing 326. The processor may apply the second image processing to provide processed image data in embodiments according to various aspects of the present disclosure.

In embodiments, the second image processing may be different from first image processing performed in accordance with applying first image processing 316. For example, the second image processing may comprise one or more of white balancing or desaturating, while the first image processing may exclude the one or more of the white balancing or the desaturating. Alternately or additionally, the second image processing may comprise the one or more of white balancing or desaturating, while the first image processing may include a different type of white balancing and/or desaturating. For example, first image processing may comprise default auto white balancing, while second image processing may comprise partial white balance processing to improve color fidelity under certain lighting conditions, In accordance with differences between the second image processing and the first image processing, image data generated via a same filter and same image sensor may be automatically adjusted in different manners in accordance with different ambient lighting conditions.

In embodiments, applying second image processing 326 may comprise applying image processing to white balance the image data. The image processing to white balance the image data may be applied to provide a non-neutral white balance to the image data. The image processing may be applied under an ambient lighting condition comprising a halogen lighting condition. The image processing may comprise partial white balancing. The partial white balancing may be applied to under a halogen lighting condition to achieve the non-neutral white balance. For example, detecting an amount of ambient light 310 may include detecting a halogen lighting condition and, in accordance with the halogen lighting condition, applying image processing 326 comprising partial white balancing. The second ambient lighting condition may include the halogen lighting condition for which white balancing of the second image processing is configured to correct.

In embodiments, applying second image processing 326 may comprise desaturating at least one color in image data. The image data may comprise raw image data. For example, a processor may perform operations comprising desaturating raw image data received from an image sensor. The desaturating may be performed to decrease visibility in second image data of one or more false colors. A false color may comprise a color that differs relative to an amount of wavelengths of visible light for the color present in a scene. In contrast, a true color may comprise a color that accurately corresponds (e.g., matches, etc.) an amount of wavelengths of visible light for the color present in a scene. A false color may be a result of near-infrared light being received by an image sensor while the image sensor is used to generate image data based on wavelengths of light different from the near-infrared light (e.g., wavelengths of visible light). A quasi-bandpass filter, according to various aspects of the present disclosure, may permit the near-infrared light to be received by the image sensor and initially introduce one or more false colors in raw image data generated based on different wavelengths of light, but the desaturating may provide processed image data in which visibility (e.g., prominence, relative intensity, etc.) of the one or more false colors is reduced.

In embodiments, desaturating the at least one color may comprise changing one or more color channel values for one or more pixels in the image data associated with each color of the one or more colors. Desaturating a first color of the one or more colors may comprise changing one or more color channel values for each pixel in the image data having respective color channel values associated with the first color. For example, desaturating a color of purple may comprise changing a red color channel value and a blue color channel value channel of one or more pixels in image data that correspond to the color of purple.

In embodiments, the desaturating may be determined in accordance with a quasi-bandpass filter and/or a combination of a quasi-bandpass filter and an image sensor. For example, applying second image processing 326 may comprise desaturating image data in accordance with one or more physical properties of quasi-bandpass filter 114 and image sensor 116 with brief reference to FIG. 1. The desaturation may be determined independent of incident light received upon receiving incident light 302. For example, one or more colors changed in accordance with the desaturating and/or an amount of desaturation applied to each color of the one or more colors may be predetermined and commonly applied to each image data to which second image processing is applied.

In embodiments, desaturating the at least one color may comprise desaturating each color in the image data. Desaturating each color may comprise a uniform desaturation of image data. A change may be applied to each pixel of image data independent of a color to which the pixel corresponds. Pixels associated with each color of visible light may have their respective color channel values modified in accordance with desaturating each color in the image data. For example, pixels in image data associated with each color in visible light of red, orange, yellow, green, blue, and purple (e.g., violet) may be desaturated in accordance with desaturating each color in the image data. A range of possible saturation of a color may comprise a maximum saturation value of 100% saturation (e.g., maximum color intensity) and a minimum saturation value of 0% saturation (e.g., minimum color intensity). All colors represented in image data may be reduced to less than 100% saturation in accordance with desaturating each color in the image data. By desaturating each color in the image data, an intensity of each color in the image data may be decreased, thereby decreasing an extent to which each false color may be represented and/or perceivable in the image data.

In embodiments, desaturating the at least one color may comprise desaturating a first color in image data and maintaining a saturation of a second color in the image data. The first color may be associated with a false color caused by at least one wavelength of ambient light received in a band of wavelengths attenuated by a quasi-bandpass filter. The at least one wavelength may be received by an image sensor from which the image data is generated. The image data may comprise raw image data. Desaturating the first color may comprise decreasing a saturation of the first color and maintaining the saturation of the second color in a same image data. For example, a saturation of the first color may be decreased to less than 100% saturation while the saturation of the second color may be maintained at 100% saturation. By selectively desaturating the first color, an intensity of a false color corresponding to the first color may be decreased in the image data, while an intensity (e.g., visibility, prominence, relative intensity, etc.) of a true color corresponding to the second color may be retained. Such an arrangement may enable color correction comprising the desaturation to be selectively applied to one or more false colors in the image data, while retaining one or more true colors in the image data. As discussed above, each of the one or more false colors and the one or more true colors may be associated with wavelengths of ambient light respectively attenuated and passed by a common quasi-bandpass filter involved with generating raw image data.

In embodiments, an attenuated band of near-infrared light may cause one or more imaging errors in colors associated with wavelengths of visible light at a shorter wavelength end of the visible spectrum. For example, color pixel sensors of an image sensor may inaccurately detect visible wavelengths associated with one or more colors of purple (e.g., violet) and/or blue. Purple may correspond to wavelengths of light between approximately 380 nanometers (nm) and 450 nm, while blue may correspond to wavelengths of light between approximately 450 nm and 500 nm. Accordingly, and in embodiments, the first color desaturated may comprise one of purple or blue and the second color may comprise a second color, different from the first color. For example, desaturating the at least one color may comprise decreasing a saturation of purple in image data and maintaining a saturation of yellow in the image data. Pixels in the image data having color channel values corresponding to the first color may be modified in accordance with the desaturating, while pixels in the image data having color channel values corresponding to the second color may be unmodified in accordance with the desaturating. In embodiments, the first color and second color may be predetermined. For example, the first color and second color may be determined empirically and/or calculated in accordance with properties of a given quasi-bandpass filter or a combination of a given quasi-bandpass filter and a given image sensor.

In embodiments, desaturating the at least one color may comprise combinations of desaturating the at least one color. For example, desaturating the at least one color may comprise a combination of desaturating each color and selectively desaturating a first color as discussed above. Alternately or additionally, desaturating the at least one color may comprise a combination of desaturating two or more different first colors. For example, each color of blue and purple may be desaturated while one or more second colors (e.g., yellow and/or red) may be maintained in desaturating in accordance with various aspects of the present disclosure.

In embodiments, encoding image data in color 328 may be performed. The image data may comprise processed image data provided as a result of applying second image processing 326 to image data. Encoding image data in color 328 may comprise encoding image data in a second mode. The second mode may be a color mode. The second mode may be an operating mode of an encoder or processor. For example, in response to determining a second ambient lighting condition, processor 130 may send a second control signal to encoder 140 and/or ISP 170 to process and encode image data received by image sensor 116 in a second mode. In embodiments, encoding image data in color 328 may further comprise recording the encoded second image data (e.g., color image data) in a non-transitory, computer-readable storage medium. In embodiments, method 300 may loop back to receiving incident light 302 and wait for a subsequent amount of incident light to be received. In some embodiments, method 300 may end after operations of blocks 322-328 have been completed.

In embodiments, one or more operations of FIG. 3 may be repeated. The one or more operations may be repeated periodically. For example, one or more operations may be repeated for each frame of image data generated by a camera system. Generating video data according to various aspects of the present disclosure may comprise performing a first instance of one or more operations of method 300 to generate a first image data of the video data and performing a second instance of the one or more operations (e.g., repeating the one or more operations) to generate a second image data of the video data. In various embodiments, one or more operations of method may result in a different sequence of operations and/or results. For example, and in accordance with different lighting conditions, generating image data may comprise generating first image data responsive to determining a first ambient lighting condition and, subsequent to the first image data being generated, generating second image data responsive to determining a second ambient lighting condition. Each of first image data generated based on a band of wavelengths of attenuated near-infrared light and second image data generated based on wavelengths of visible light may be generated in accordance with repeatedly performing one or more operations of method 300. For each different image data generated, one or more same components (e.g., a same filter, a same pixel sensor, a same image sensor, a same processor, etc.) may be applied to generate different image data under different lighting conditions.

In various embodiments, a first ambient lighting condition may be determined in response to detecting 310 when the detected first amount of ambient visible light is below a predetermined reference value and a second ambient lighting condition may be determined in response to detecting 310 when the detected second amount of ambient visible light is above the predetermined reference value. For example, the predetermined reference value may be less than 1 lux, less than 2 lux, less than 4 lux, less than 8 lux, less than 16 lux, or less than 32 lux.

In various embodiments, the first ambient lighting condition corresponds with a first operating mode of system 100. For example, the first ambient lighting condition may correspond with IR mode, in which processor 130 may provide a first control signal to activate light source 122 and another control signal to encoder 140 to encode image data in monochrome.

In various embodiments, the second ambient lighting condition corresponds with a second operating mode of system 100. For example, the second ambient lighting condition may correspond with a color mode, in which processor 130 may provide a second control signal to encode 140 to encode image data in color.

In various embodiments, the power and/or peak radiant intensity of light source 122 may be optimized, such that emitted light 125, although attenuated by quasi-bandpass filter 214, is still sufficient to illuminate scene 5, while not posing a risk to eye safety. In this manner, quasi-bandpass filter 214 may both attenuate undesirable near-infrared wavelengths of ambient light 1, while still passing near-infrared wavelengths of emitted light 125 to image sensor 116. In color mode, undesirable near-infrared wavelengths of ambient light 1 are attenuated by quasi-bandpass filter 114. Because near-infrared band 210 may overlap a near-infrared absorption band, peak near-infrared transmittance 212 of near-infrared band 210 may be optimized between 1% and 50% without significantly diminishing image quality. In IR mode, while desirable near-infrared wavelengths of emitted light 125 are attenuated by quasi-bandpass filter 114, the power and/or peak radiant intensity of light source 122 may be optimized such that sufficient emitted light 125 still reaches image sensor 114.

After considering this disclosure, it will be apparent to one skilled in the art how the invention is implemented in various alternative embodiments and alternative applications. However, although various embodiments of the present invention will be described herein, it is understood that these embodiments are presented by way of example only, and not limitation. As such, this description of various alternative embodiments should not be construed to limit the scope or breadth of the present invention. Statements of advantages or other aspects apply to specific exemplary embodiments, and not necessarily to all embodiments covered by the claims.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures. The scope of the disclosure is accordingly to be limited by nothing other than the appended claims and their legal equivalents, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments. Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:
1. A camera comprising:
an aperture for receiving light;
a quasi-bandpass filter for filtering the light received by the aperture to provide filtered light, the filtered light including visible light and attenuated near-infrared light; and an image sensor for detecting image data in response to the filtered light, wherein a transmission spectrum of the quasi-bandpass filter includes:
  a visible band comprising wavelengths of the visible light, the visible band having a peak visible transmittance; and
  a near-infrared band comprising wavelengths of the attenuated near-infrared light, the near-infrared band having a peak near-infrared transmittance, the peak near-infrared transmittance comprising a ratio of light passed by the quasi-bandpass filter in the near-infrared band to light received by the quasi-bandpass filter in the near-infrared band being greater than 1% and not exceeding 50%.

2. The camera of claim 1 wherein the near-infrared band comprises a near-infrared atmospheric absorption band.

3. The camera of claim 1 wherein the wavelengths of the attenuated near-infrared light comprise a rho sigma tau atmospheric absorption band.

4. The camera of claim 1 further comprising a light source, the light source having an emission band overlapping at least a portion of the near-infrared band of the quasi-bandpass filter.

5. The camera of claim 4 wherein a center wavelength of the light source is about 950 nanometers.

6. The camera of claim 1 wherein the image sensor comprises a color filter array consisting of visible color pixels.

7. The camera of claim 1 wherein the quasi-bandpass filter is a static, fixed filter.

8. The camera of claim 1 wherein the quasi-bandpass filter is a single thin-film interference filter.

9. A surveillance system comprising:
  a quasi-bandpass filter for passing wavelengths of visible light and attenuating a band of wavelengths of near-infrared light, a peak near-infrared transmittance of the quasi-bandpass filter greater than zero for the band of wavelengths attenuated by the quasi-bandpass filter and less than a peak visible transmittance of the quasi-bandpass filter for the wavelengths of visible light, the peak near-infrared transmittance comprises a ratio of light passed by the quasi-bandpass filter to light received by the quasi-bandpass filter in the band of wavelengths of near-infrared light, and the peak visible transmittance comprises a ratio of light passed by the quasi-bandpass filter to light received by the quasi-bandpass filter for the wavelengths of visible light;
  an image sensor for receiving the wavelengths of visible light and the band of wavelengths attenuated by the quasi-bandpass filter;
  a light source having an emission band overlapping at least a portion of the band of wavelengths attenuated by the quasi-bandpass filter;
  a photodetector configured to detect a signal corresponding to an amount of ambient visible light and control the light source in accordance with the signal; and
  a processor in communication with the photodetector, the light source, and the image sensor wherein the processor is configured to perform operations comprising:
    detecting, via the photodetector, different amounts of ambient visible light including a first amount of ambient visible light and a second amount of ambient visible light, the second amount of ambient visible light different from the first amount of ambient visible light;
    in response to detecting the first amount of ambient visible light, activating the light source and generating first image data based on the band of wavelengths attenuated by the quasi-bandpass filter and received by the image sensor; and
    in response to detecting the second amount of ambient visible light, deactivating the light source and generating second image data based on the wavelengths of visible light passed by the quasi-bandpass filter and received by the image sensor.

10. The system of claim 9 wherein the image sensor comprises the photodetector.

11. The system of claim 9 wherein the peak near-infrared transmittance is greater than 1% and does not exceed 50%.

12. The system of claim 11, wherein:
  generating the first image data comprises encoding the first image data in monochrome; and
  generating the second image data comprises encoding the second image data in color.

13. The system of claim 11, wherein generating the second image data comprises:
  receiving raw image data from the image sensor; and
  applying a partial white balance processing to the raw image data under halogen lighting conditions to provide processed data having a non-neutral white balance.

14. The system of claim 11, wherein generating the second image data comprises:
  receiving raw image data from the image sensor; and
  desaturating at least one color in the raw image data.

15. The system of claim 14, wherein desaturating the at least one color comprises at least one of:
  desaturating each color in the raw image data; or
  desaturating a first color in the raw image data and maintaining a saturation of a second color in the raw image data, wherein the first color is associated with a false color caused by at least one wavelength of the near-infrared light received by the image sensor in the band of wavelengths attenuated by the quasi-bandpass filter.

16. The system of claim 15, wherein desaturating the at least one color comprises desaturating the first color in the raw image data and maintaining the saturation of the second color in the raw image data, and wherein the first color comprises a color of purple.

17. The system of claim 11 wherein the system comprises an in-vehicle surveillance system.

18. A method performed by a dual mode camera comprising steps of:
  passing, by a quasi-bandpass filter of the dual mode camera, ambient light to an image sensor of the dual mode camera, wherein the quasi-bandpass filter passes visible light of the ambient light and attenuates a portion of near-infrared light of the ambient light, wherein the quasi-bandpass filter has a peak near-infrared transmittance greater than zero for the portion of near-infrared light of the ambient light and less than a peak visible transmittance of the visible light of the ambient light, wherein the peak near-infrared transmittance comprises a ratio of light passed by the quasi-bandpass filter to light received by the quasi-bandpass filter in the portion of near-infrared light of the ambient light, and wherein the peak visible transmittance comprises a ratio of light passed by the quasi-bandpass filter to light received by the quasi-bandpass filter for the visible light of the ambient light;
  generating, by the image sensor, image data from the ambient light;

determining, by a processor of the dual mode camera, a first ambient lighting condition of the ambient light;

encoding, by the processor, the image data in a first mode, the first mode including:
- encoding the image data in monochrome; and
- activating a light source having an emission band overlapping at least a portion of the near-infrared light attenuated by the quasi-bandpass filter;

determining, by the processor, a second ambient lighting condition of the ambient light; and encoding, by the processor, the image data detected by the image sensor in a second mode, the second mode including:
- encoding the image data in color, wherein the first ambient lighting condition is associated with a first detected amount of ambient visible light and the second ambient lighting condition is associated with a second detected amount of ambient visible light, wherein the first detected amount of ambient visible light is less than the second detected amount of ambient visible light and each of the first detected amount of ambient visible light and the second detected amount of ambient visible light are detected by a photodetector.

19. The method of claim 18 wherein the portion of near-infrared light attenuated by the quasi-bandpass filter overlaps with a near-infrared atmospheric absorption band.

20. The method of claim 19, wherein determining the first ambient lighting condition of the ambient light includes determining that the first detected amount of ambient visible light is greater than a reference value; and determining the second ambient lighting condition of the ambient light includes determining that the second detected amount of ambient visible light is less than the reference value.

\* \* \* \* \*